United States Patent
Halm et al.

[11] Patent Number: 5,966,997
[45] Date of Patent: Oct. 19, 1999

[54] DEVICE FOR TRANSMITTING A LINEAR MOTION WITH FORCE LIMITER

[75] Inventors: Christian Halm, Garbsen; Manfred Fischer, Markdorf; Bernard Hunold, Friedrichshafen, all of Germany

[73] Assignee: ZF Luftfahrttechnik GmbH, Calden, Germany

[21] Appl. No.: 08/963,428

[22] Filed: Nov. 3, 1997

[30] Foreign Application Priority Data

Nov. 14, 1996 [DE] Germany ............... 196 47 077

[51] Int. Cl.⁶ ............... G05G 1/00; F16H 21/22
[52] U.S. Cl. ................. 74/582; 74/44
[58] Field of Search ............... 74/581, 582, 44

[56] References Cited

U.S. PATENT DOCUMENTS

| | | | |
|---|---|---|---|
| 2,488,730 | 11/1949 | Lake et al. | 74/582 X |
| 3,283,610 | 11/1966 | Bredow | 74/582 |
| 3,285,377 | 11/1966 | Rasmussen. | |
| 4,693,659 | 9/1987 | Burke et al. | 74/582 X |
| 5,392,663 | 2/1995 | Charles | 74/586 X |
| 5,526,983 | 6/1996 | Petit | 74/582 X |

FOREIGN PATENT DOCUMENTS

| | | |
|---|---|---|
| 451 480 | 10/1927 | Germany. |
| 27 37 169 | 5/1978 | Germany. |
| 36 20 886 A1 | 1/1988 | Germany. |
| 36 20 886 C2 | 3/1989 | Germany. |
| 40 05 235 A1 | 9/1990 | Germany. |
| 195 03 051 A1 | 8/1996 | Germany. |
| WO 90/09921 | 9/1990 | WIPO. |

*Primary Examiner*—Thomas R. Hannon
*Assistant Examiner*—Brandon C. Stallman
*Attorney, Agent, or Firm*—Davis and Bujold

[57] ABSTRACT

A device for transmitting linear motion for adjustment of a wing element (4) is provided with one input part (23) and one output part (26) wherein between the input part (23) and the output part (26) an uncoupling mechanism is provided which, above a preset force (release force) makes relative motion between the input part and the output part possible. One or more prestressed springs (42), which can absorb energy during relative motion, upon unloading, restores the input and output parts to an initial position. A translation mechanism converts the relative motion between the input part (23) and the output part (26). The converted motion acts upon the spring (42) whereby a force-path characteristic line of the device, corresponding to the translation mechanism, can be obtained. The translation mechanism consists of a crankshaft (52) with cam discs (50A, 50B) driven by a connecting rod (46) which act upon a piston (48) longitudinally movable within the housing (30) and prestressed by springs (42).

12 Claims, 6 Drawing Sheets

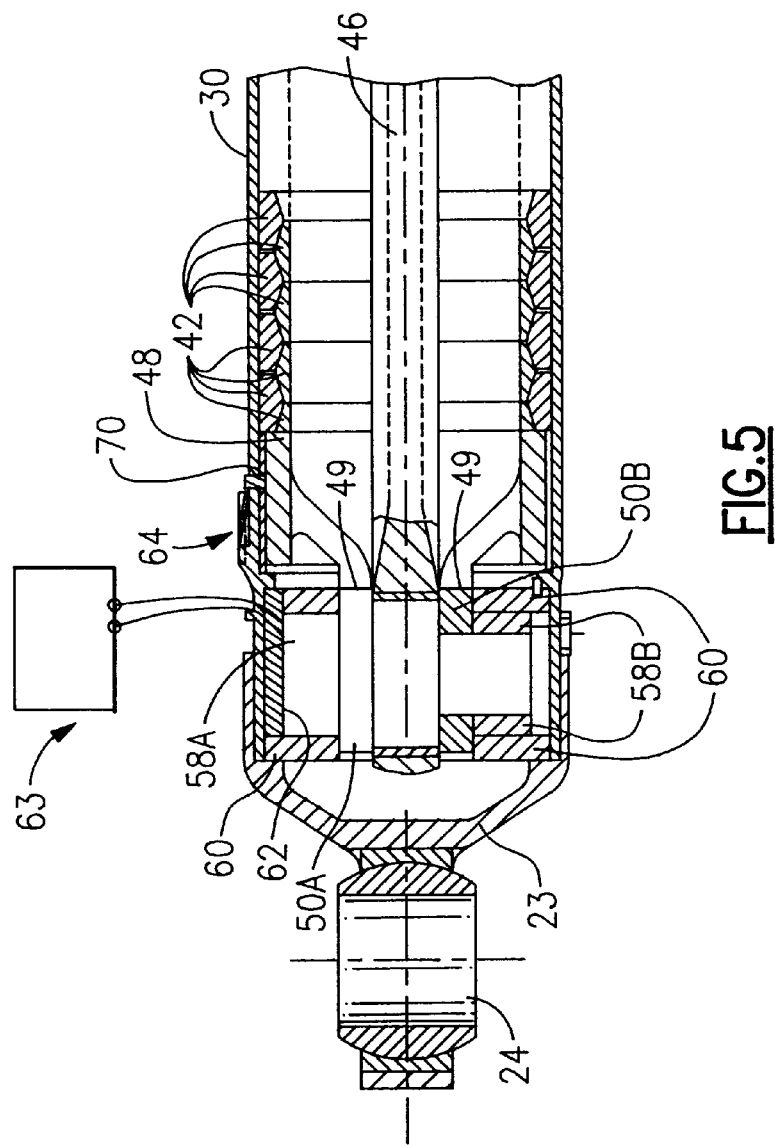
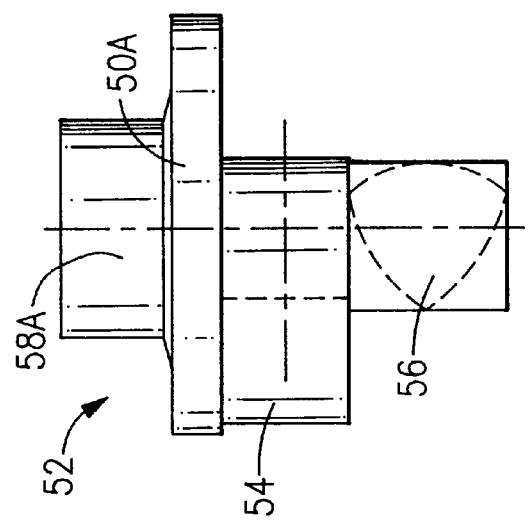
FIG.4
FIG.5

OPTICAL INDICATION (2 : 1)
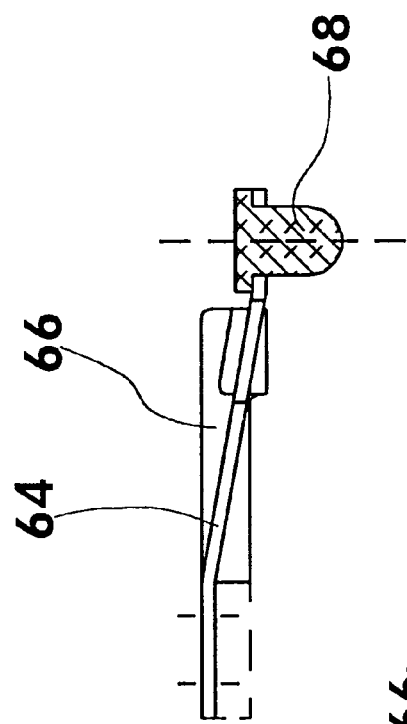
Fig. 7
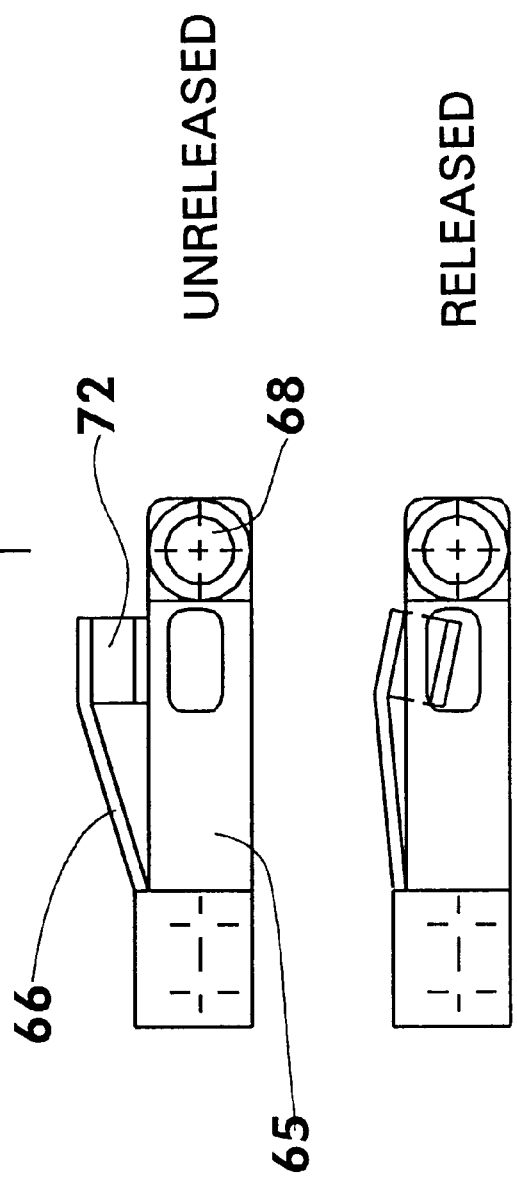
Fig. 8 UNRELEASED
Fig. 9 RELEASED

DEVICE FOR TRANSMITTING A LINEAR MOTION WITH FORCE LIMITER

The invention concerns a device for transmitting linear motion for adjusting an element, in particular a wing element on an aircraft, having one input part and one output part wherein, between the input part and the output part, an uncoupling means is provided which, above a preset force (release force), makes a relative motion between the input part and the output part possible and having one or more prestressed springs which, during relative motion, can absorb energy and which, when unloaded, restores the input and output parts to the initial position.

Devices, which linearly transmit traction and/or pressure forces, are used in the many varied fields. A possible field is wing elements on an aircraft which, during start or landing at low speeds, for example, are extended for increasing the lift. Crank gears, with pivoted shift bars, are used for driving said wing elements. They act upon the wing elements directly or via other members. Thereby a turning motion of the crank is converted to linear motion. If the motion of a wing element is now blocked, such as by icing, very strong reaction forces are generated which must be absorbed by the aircraft structure. The aircraft structure is dimensioned according to the maximum of possible forces. Stronger possible forces need a heavier structure. Said forces must now be limited so that the aircraft structure can be designed lighter.

Different possibilities are known for limiting said reaction forces. Torque-limiting systems are known from the practice which are front-mounted on the drive side on separate crank gears. There can be several crank gears per wing with a front-mounted torque-limiting system and an articulated shift bar. The disadvantage is that the different efficiencies and starting torques of the crank gear in said system become perceptible. In a heavily moving crank gear, the release torque of the torque-limiting system must be at least strong enough so as not to release without reason. Therefrom strong possible reaction forces result, in a lightly moving crank gear, for which the aircraft structure must be designed.

Another disadvantage results from the kinematics of the crank and the shift bar. Depending on deviations of the crank, different forces generate in the shift bar with constant torque. In this manner, during maximum or minimum deviation, stronger reaction forces likewise result upon the aircraft structure.

DE 39 05 576 describes a driving device having a variable torque-limiting system which takes into account the problem resulting from the kinematics. In this known solution, however, torque limitation is relatively inaccurate and, in addition, this device is relatively heavy.

Also known are torque- or force-transmitting parts having predetermined breaking points which break when a preset force is exceeded. But the disadvantage here is that the torque or force flux then is, as a rule, completely interrupted and the limitation is not reversible. After overload, the parts have to be replaced.

In order to limit the reaction forces upon the structure, without the disadvantages which accrue from the different efficiencies and starting torques of the crank gear and from the kinematics of the crank and the shift bar, it is advantageous to carry out the limitation in an installed device instead of the shift bar.

The Applicant's DE 195 03 051 has already disclosed such a device for transmitting a linear motion with a force limitation, which is installed instead of the shift bar and which, above a preset force (release force), makes a reversible relative motion between the input part and the output part possible and below said force fixedly transmits a motion to the crank.

The problem, to be solved by the invention, is to further develop the prior art.

According to the invention, this problem is solved by the fact that a translation mechanism converts the relative motion between the input part and the output part and the converted motion acts upon prestressed springs whereby a force-path characteristic line corresponding to the translation mechanism can be accomplished. The prestress of the springs causes the device to behave, below a specific force (release force), like a rigid shift bar.

It is advantageous if the linear relative motion is converted to a turning motion since, in this way, many translation mechanisms fitted downstream can be realized. For example, a crankshaft driven by a connecting rod eccentrically supported thereon can be selected for this purpose. The linear relative motion between the input and the output parts is impressed upon the other end of the connecting rod. The torque produced in the crankshaft depends on the leverage on the crankshaft and connecting rod and changes nonlinearly depending on the rotation angle of the crankshaft. This relationship can be utilized for a desired connection between force and path of the relative motion. At this point other translation mechanisms are likewise conceivable, such as a rack, which acts upon one or more gearwheels.

Other degrees of freedom, relative to the desired connection between force and path, can be advantageously obtained with a cam disc. The cam disc is driven by the crankshaft. A positive connection between crankshaft and cam disc, such as polygonal driving, can here transmit strong torques. The cam disc acts during its rotation, directly or via a longitudinally movable mounted member, upon the springs. The contour of the cam disc determines the connection between the rotation angle on the crankshaft and stroke and thus affects the force-path characteristic line of the device.

An advantageous improvement of the longitudinally movably supported member is a piston having a flat surface upon which the cam disc slides. Likewise, a longitudinally movably supported rotatable roller is also possible. Other systems also are obvious for the translation mechanism, such as irregularly translating gearwheels, a coupling gear with several levers in an operative connection which, for example, apply the bent lever principle.

The springs can be designed as ring springs. They offer the advantage of a high energy storage density with low weight. But other spring shapes are also conceivable, even torsion springs when a turning motion acts directly upon the springs.

Cases occur in the practice in which a wing element to be transitorily driven is blocked, for example, by icing. After one or more tests in which the force limitation responds it is, therefore, advantageous if the device again returns to the initial position, accumulated energy from the springs is used for this.

Advantageous for use as a force limitation in the aircraft is a force-path characteristic line which, below a specific force (release force), extends approximately vertically (stiff connection) and, above the release force, extends horizontally (constant force independent of the path of the relative motion). This can be obtained by an adequate selection of spring prestress and translation mechanism. It is to be borne in mind here that the force should not decrease over the path as otherwise a jerky stroke can occur.

Depending on the demands or loading capacity of the structure, it can be advantageous if the release force and the course of the force over the relative motion is symmetrical or asymmetrical as to traction and pressure, which can be respectively accomplished by the selection of the translation mechanism. The translation mechanism can be very easily adjusted by the shape of the cam disc.

For maintenance work and inspection, it is necessary that it be possible to establish whether a case of blockage has occurred and where. For this purpose, it is advantageous if the relative motion can be detected and indicated by measuring or indicator elements.

The drive combination, with a cutout, offers the advantage that the device has to be designed only for limited relative motion (for example, 10 mm). Before said limit is exceeded, the drive is disconnected thus preventing damage to the aircraft structure. In addition, by means of a cutout device, which acts upon both wing halves, a substantially different position of the wing elements is avoided. By a substantially different position of the wing elements, an undesired rolling motion of the aircraft, critical to safety, could be introduced.

Besides, the device offers, in comparison to the prior art, advantages determined by the system in respect to the number of parts, the weight and the precision of the neutral position.

Herebelow the invention is explained in detail with reference to the enclosed drawings.

FIG. 4 is an embodiment of a crankshaft in a transverse section;

FIG. 5 is a transverse section of one part of a device, according to the invention, in the (force free) initial position with the crankshaft axis in the plane of the drawing;

FIG. 7 is an enlarged representation in side elevation of an indicator device which optically indicates an occurred case of blockage;

FIG. 8 is an enlarged top view representation of the indicator device which optically indicates an occurred case of blockage in the unreleased state; and FIG. 9 is an enlarged top view representation of the indicator device which optically indicates an occurred case of blockage in the released state.

Figure 1:
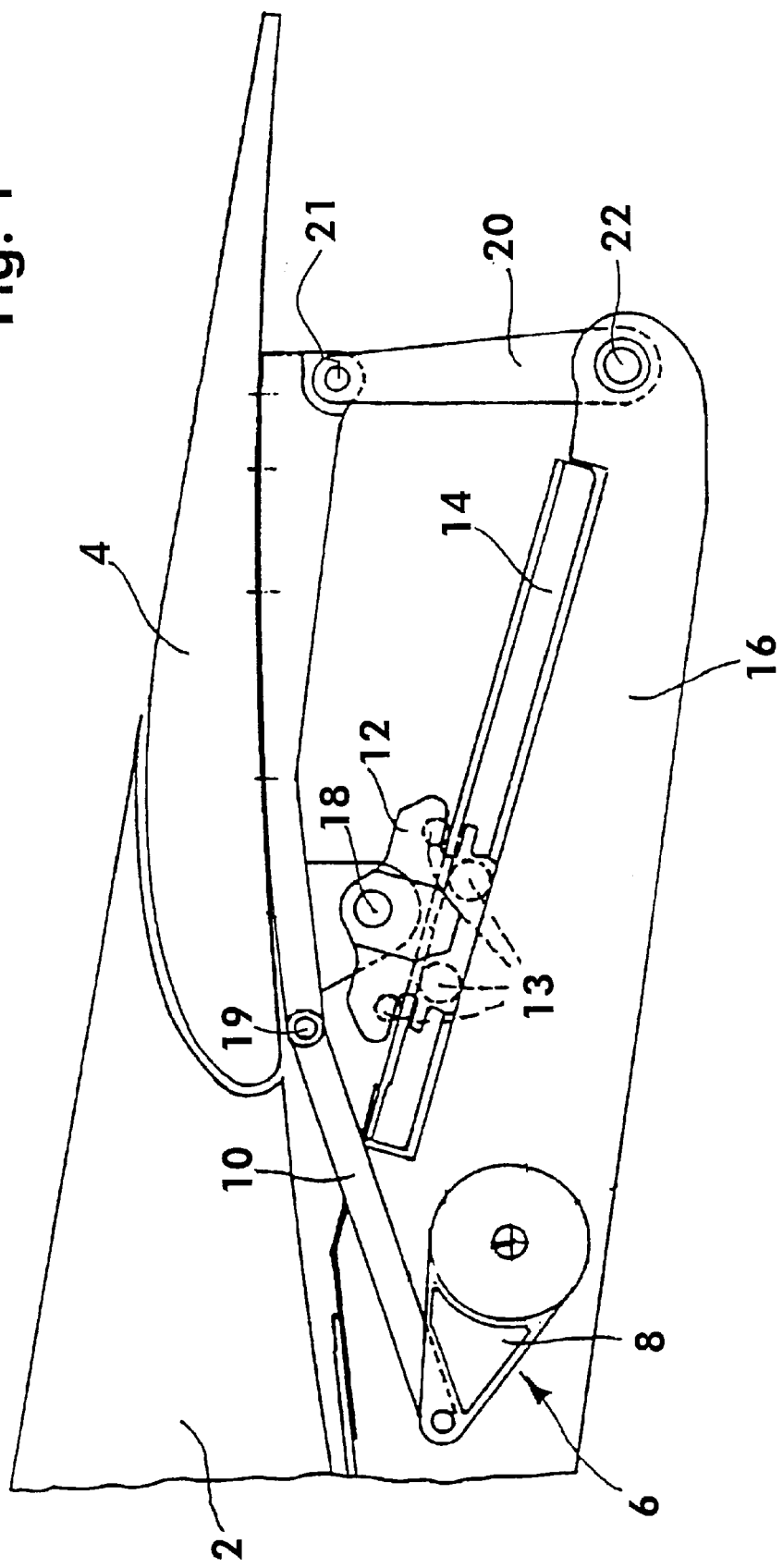
FIG. 1 is a side elevational view, in a simplified representation, of parts of a drive for adjusting a wing element.

In FIG. 1 the rear area of a hydrofoil 2 with the wing element 4 attached thereto, is to be seen. The wing element 4 is connected with a carrier wagon 12 by an articulation. The carrier wagon 12 is supported by a straight guideway 14 by guide elements 13 and is movable therealong. The guideway 14 is component part of a carrier 16 on which a crank gear 6 with crank 8 and an articulated device transmitter of linear motion (here as simple shift bar 10) and a swinger 20 are fastened. The wing element is connected by articulations 19, 21 with the shift bar 10 and the swinger 20.

The wing element 4 is adjusted as follows:

The crank gear 6 translates the turning motion of an input shaft, not shown. Upon a rotation of the crank 8 to the right, away from the initial position shown, the shift bar 10 transmits the motion to the joint of the articulation 19. The carrier wagon 12 is thereby pushed backward along the guideway 14 and the swinger 20 pivots around the rotation point of the articulation 22. In the end position, not shown, the wing element 4 is pushed backward and, in addition, further adjusted with respect to the hydrofoil 2.

Figure 2:
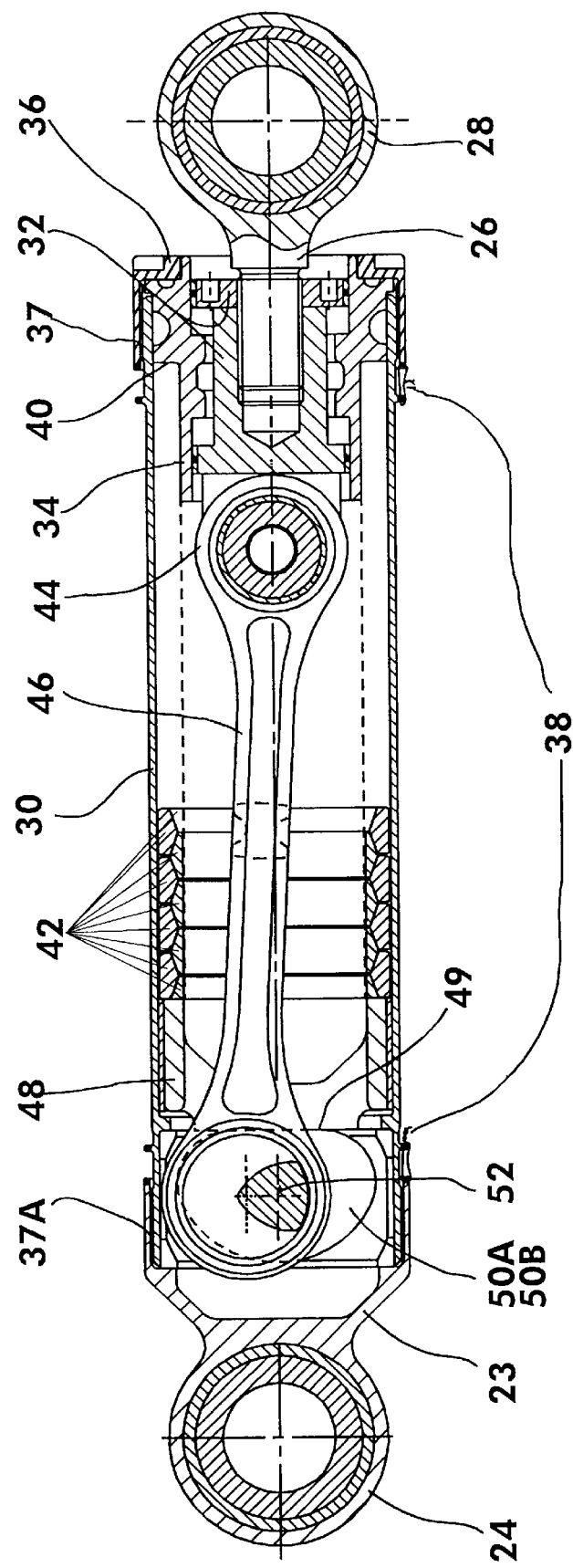
FIG. 2 is a transverse section of a device, according to the invention, in the (force free) initial position with the crankshaft axis vertical to the plane of the drawing.

To limit the reaction force upon the aircraft structure, a device is now installed, according to the invention, shown in FIG. 2, instead of the shift bar 10.

The device has an input part 23 with articulated connection 24 and an output part 26 with an articulated connection 28. A housing 30 of hollow cylinder shape, is situated between input part 23 and output part 26 which is connected with the input part 23 by means of screw connection 37A. A guide cylinder 34, in which is passed a two-part guide piston 32, is disposed in the housing 30 on the side of the output part. A cover 36 is mounted on the housing 30 by means of screw connection 37. The cover 36 fixes the guide piston 32 in the housing 30. Wire security devices 38 on the cover 36 and on the input part 23, secure the screw connections 37, 37A with the housing 30. The longitudinally movable guide piston 32 is situated between the output part 26 and an articulation 44 of a connecting rod 46. The connecting rod 46 is connected with an eccentric connecting rod bearing 54, shown in FIG. 4, of a crankshaft 52 on the side of the input part, which is rotatably supported with a crankshaft pivot 58A in a crankshaft bearing 60 which can be seen in FIG. 5. For reasons of assembly, the crankshaft 52 is designed (FIG. 4) asymmetrically with reference to a central cutaway plane orthogonal in the shaft direction to the axis of rotation. While the cam disc 50A and the crankshaft pivot 58A are integrated on one side of the cutaway plane (in FIG. 4: top) of the crankshaft 52, on the other side, the cam disc 50B and the crankshaft pivot 58B are each separate parts slipped on the polygonal driver 56 in an assembled state (FIG. 4, FIG. 5).

In the embodiment described, the housing 30 of hollow cylinder shape and the crankshaft bearing are firmly connected with the input part 23. It would also be possible to exchange input and output parts. For the function of force limitation, it is indifferent which side is being driven on or off.

The ring springs 42, which are not shown in the figures in their entire length, are clamped between the bearing surface 40 of the guide cylinder 34 and the piston 48.

The piston 48 is situated in the hollow-cylinder shaped housing 30, between ring springs 42 and the cam discs 50A, 50B, and transmits the spring tension to the bearing surfaces 49 on the cam discs 50A, 50B.

In FIG. 5, how the connecting rod 46 penetrates the piston 48 and how the cam discs 50A, 50B, on both sides of the connecting rod 46, are in contact with the bearing surfaces of the piston 48 can be seen. On the front side of the crankshaft pivot 58A is situated a rotation-angle sensor 62 which is connected to drive cutout device 63. The drive cutout device, after a specific path of the relative motion, disconnects the input power.

Likewise to be seen in FIG. 5 is an optical indicator device 64 which is shown enlarged in FIGS. 7 to 9. It consists of an indicator pin 68 which, in the initial position of the device, is retained in a recess 70 in the piston 48 by a spring 65 fastened on the housing 30. In the unreleased position, shown in FIGS. 5 and 8, an indicator element 72 is cushioned laterally on the spring 64 by another spring 66.

The mode of operation of the device for transmitting linear motion with a force limitation is as follows:

If the longitudinal force (traction or pressure), between the input part 23 and the output part 26, exceeds the release force, the torque on the crankshaft 52 increases to such an extent that it turns with respect to the initial position shown in FIG. 2 and, at the same time, takes along the cam discs 50A, 50B. The cam discs 50A, 50B are shaped in such a manner that now the distance between the axis of rotation of the crankshaft and the bearing surface 49 of the piston 48, abutting against the cam discs 50A, 50B, increases during said rotation, the piston 48 being moved against the spring tension of the ring springs 42. During rotation, the cam discs 50A, 50B slide under friction along the bearing surfaces 49.

Figure 3:
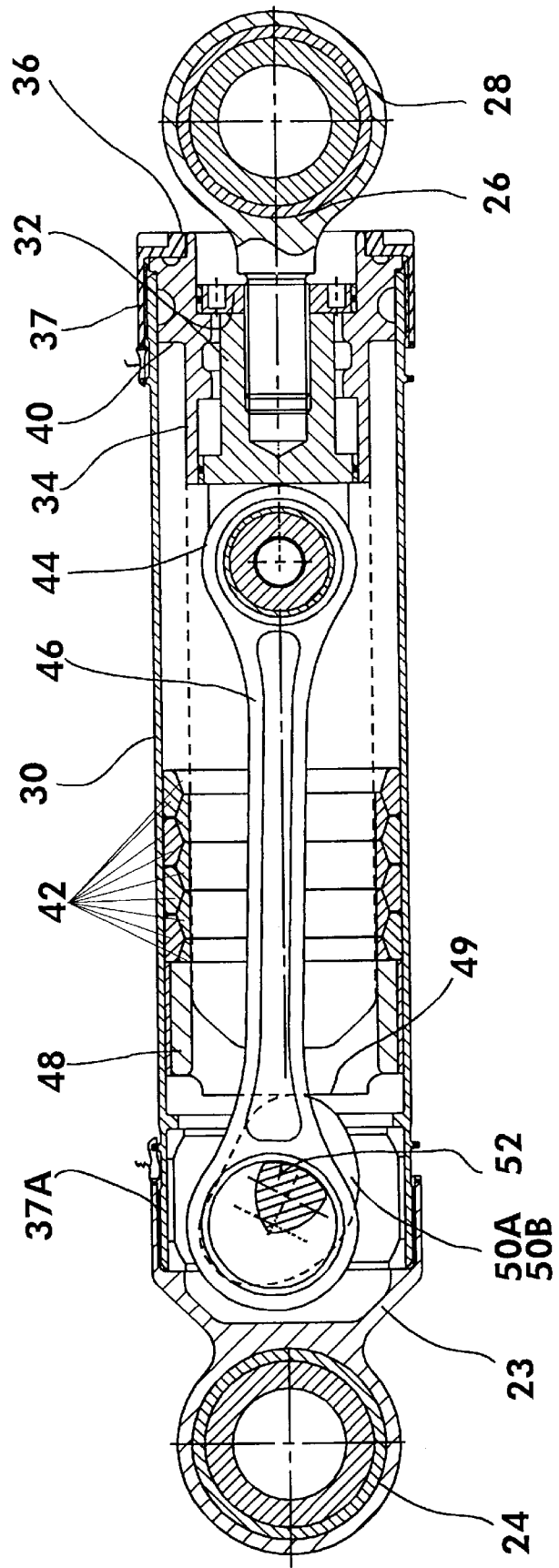
FIG. 3 is a transverse section of a device, according to the invention, in a run-in position with the crankshaft axis vertical to the plane of the drawing.

FIG. 3 shows the device in a driven position. The distance between input part 23 and output part 26 is reduced. The crankshaft 52 with the cam discs 50A, 50B is rotated relative to the initial position and the piston 48 is deviated by the cam discs 50A, 50B from the initial position shown in FIG. 2. The ring springs 42 are compressed.

The optical indicator device operates as described herebelow:

If relative motion occurs between the piston 48 and the housing 30, the indicator pin 68 is forced out of the recess 70 of the piston 48. At the same time, the spring 65 (FIG. 7) is also moved so that the indicator element 72 sideslips and is brought by the spring 66 to the released position shown in FIG. 9.

Figure 6:
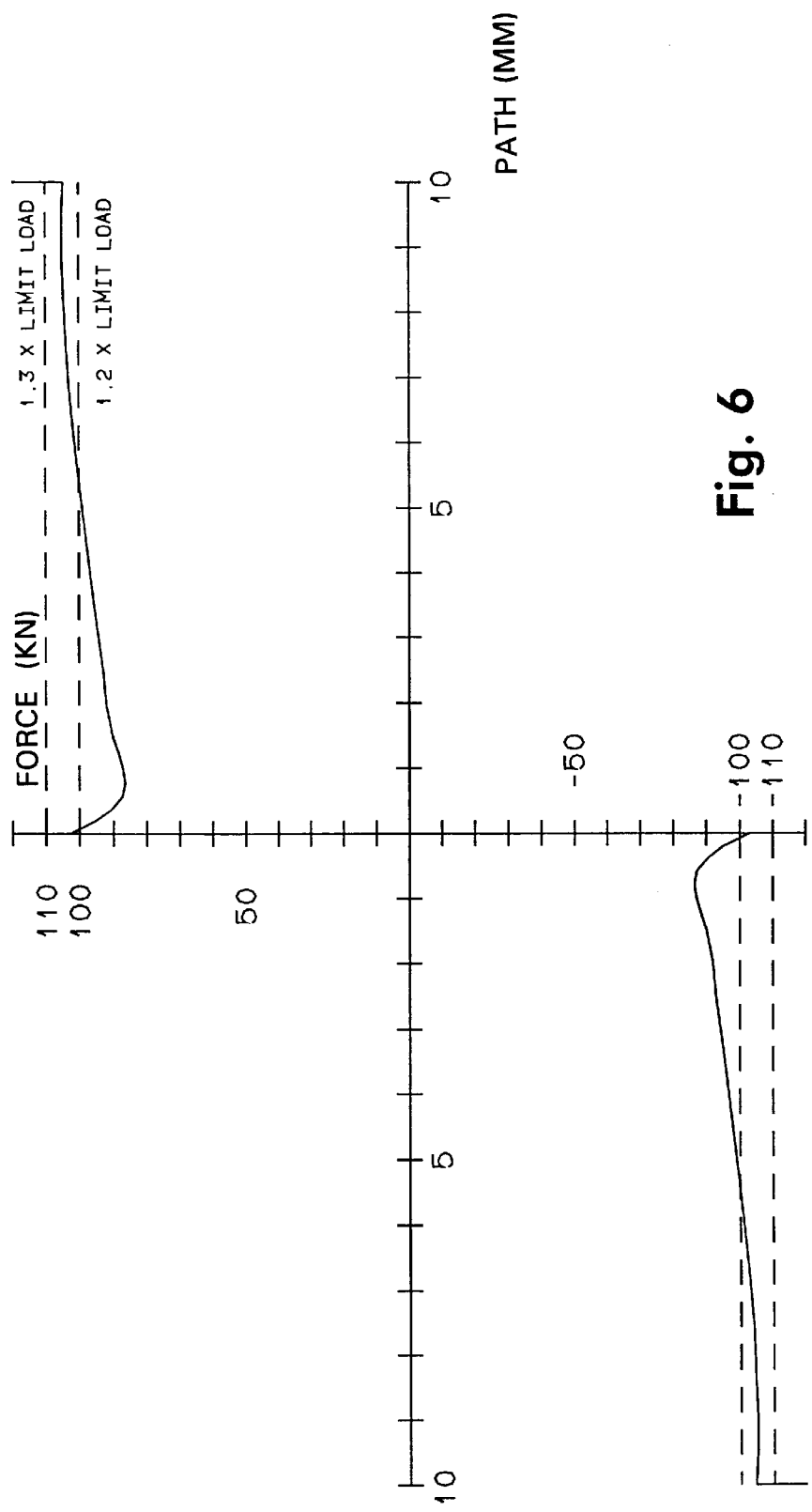
FIG. 6 is a diagrammatic representation of a force-path characteristic line obtainable with the device according to the invention.

FIG. 6 shows a diagrammatic representation of a force-path characteristic line achievable with the device. Below the release force 100 kN, no relative motion occurs; the device behaves like a rigid shift bar. In the transition from static friction to sliding friction, between cam discs 50A, 50B and bearing surface 49, the force at first diminishes somewhat over the path in order to then rise evenly. Even at the maximum path of the relative motion (the end position) it remains below a required value of 1.3 times the release force. In the designed symmetrical cam discs 50A, 50B, a force-path characteristic line symmetrical in relation to traction and pressure, which is shown here, is obtained.

We claim:

1. A device for transmitting linear motion for adjustment of a wing element of an aircraft, the device for transmitting linear motion comprising;

an input part (23) being coupled to an output part (26);
    a coupling mechanism being provided between said input part (23) and said output part (26), and the coupling mechanism facilitating, above a preset release force threshold, relative linear motion between said input part (23) and said output part (26) to at least partially absorb an excess force applied to said device for transmitting linear motion, and the coupling mechanism comprising:
        at least one prestressed spring (42) being provided between said input part (23) and said output part (26) for absorbing energy during relative linear motion between said input part (23) and said output part (26) and, upon discontinuation of the excess applied force, restoring said input part (23) and said output part (26) back to initial spaced positions; and
        a connecting rod (46) interconnecting said input part (23) with said output part (26) for transmitting force therebetween; and
        a crankshaft (52) eccentrically engaging with one end of the connecting rod (46), and the crankshaft (52) inducing a converting motion which converts the relative linear motion between said input part (23) and said output part (26) into rotary motion;
    wherein the converting motion is conveyed to said at least one prestressed spring (42) as a force-path characteristic line of said device for transmitting linear motion.

2. The device for transmitting linear motion according to claim 1, wherein said crankshaft (52) is one of directly driven and driven by a polygonal drive member (56) which is at least one cam disc (50A, 50B) that, via a piston (48) longitudinally movably supported within said input part (23), acts upon said at least one prestressed spring (42) such that the force-path characteristic line of said device for transmitting linear motion is influenced by an exterior contour of said cam discs (50A, 50B).

3. The device for transmitting linear motion according to claim 1, wherein said at least one prestressed spring (42) comprises a plurality of sequentially arranged ring springs.

4. The device for transmitting linear motion according to claim 1, wherein said converting motion and the prestress of said at least one prestressed springs (42) are designed so that, as a function of the relative linear motion, the force-path characteristic line proceeds as a substantially vertical function below the preset release force threshold as a rigid connection; in a range over the preset release force threshold, the force-path characteristic line proceeds as a substantially horizontal function as an elastic connection; and, in an end position, the force-path characteristic line is prevented from exceeding 1.3 times the preset release force threshold.

5. The device for transmitting linear motion according to claim 1, wherein said converting motion and the prestress of said at least one prestressed spring (42) are selected so that, as a function of the relative linear motion, the force-path characteristic line is symmetrical with respect to both a tension force and a compression force.

6. The device for transmitting linear motion according to claim 1, wherein said connecting motion and the prestress of said at least one prestressed spring (42) are selected so that, as a function of the relative linear motion, the force-path characteristic line is asymmetrical with respect to both a tension force and a compression force.

7. The device for transmitting linear motion according to claim 1, wherein an optical indicator device (64) is coupled to said device for transmitting linear motion to indicated any relative motion occurring between said input part (23) and said output part (26).

8. The device for transmitting linear motion according to claim 1, wherein a measuring element (62, 63) is coupled to said device for transmitting linear motion to detect any relative motion between said input part (23) and said output part (26).

9. The device for transmitting linear motion according to claim 8, wherein a drive cutout device is coupled to said device for transmitting linear motion to disconnect, after a specific path of the relative linear motion, a supply of input power to said device for transmitting linear motion.

10. A device for transmitting linear motion for the adjustment of a wing element of an aircraft, the device for transmitting linear motion comprising;

an input part (23) being coupled to an output part (26);
    a coupling mechanism being provided between said input part (23) and said output part (26), and the coupling mechanism facilitating, above a preset release force threshold, relative linear motion between said input part (23) and said output part (26) to at least partially absorb an excess force applied to said device for transmitting linear motion:
        at least one prestressed spring (42) being provided between said input part (23) and said output part (26) for absorbing energy during relative linear motion between said input part (23) and said output part (26) and, upon discontinuation of the excess applied force, restoring said input part (23) and said output part (26) back to initial spaced positions; and a translation mechanism (46, 52, 50A, 50B, 48) being coupled between said input part (23) and said output part (26) for converting the relative linear motion, between said input part (23) and said output part (26), into a converted motion acting upon said at least one prestressed spring (42) whereby a force-path characteristic line of said device for transmitting linear motion, corresponding to said translation mechanism (46, 52, 50A, 50B, 48), is achieved.

11. The device for transmitting linear motion according to claim 10, wherein the translation mechanism comprises a crankshaft (52) which is rotatably driveable by eccentrically engaging a connecting rod (46), and the connecting rod couples and transmits the relative linear motion between said input part (23) and said output part (26), and the relative linear motion is converted to rotary motion via the engagement with said crankshaft.

12. The device for transmitting linear motion according to claim 11, wherein said crankshaft (52) is one of directly driven and driven via a polygonal drive member (56) which has at least one cam disc (50A, 50B) in contact with a piston (48) that is longitudinally movably supported within said input part (23), and the piston acts upon said at least prestressed spring (42) whereby an exterior contour of said cam discs (50A, 50B) exerts influence upon the force-path characteristic line of said device for transmitting linear motion.

* * * * *